United States Patent
Kaga

(10) Patent No.: US 11,190,685 B2
(45) Date of Patent: Nov. 30, 2021

(54) AUDIO DATA ACQUISITION DEVICE INCLUDING A TOP SURFACE TO BE ATTACHED TO A BOTTOM OF AN OMNIDIRECTIONAL IMAGE SENSING DEVICE

(71) Applicant: Ryota Kaga, Tokyo (JP)

(72) Inventor: Ryota Kaga, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/901,181

(22) Filed: Jun. 15, 2020

(65) Prior Publication Data

US 2020/0314334 A1  Oct. 1, 2020

Related U.S. Application Data

(62) Division of application No. 15/914,097, filed on Mar. 7, 2018, now Pat. No. 10,721,399.

(30) Foreign Application Priority Data

Mar. 16, 2017  (JP) .............................. JP2017-050710

(51) Int. Cl.
 *H04N 5/232*  (2006.01)
 *H04N 5/225*  (2006.01)
 (Continued)

(52) U.S. Cl.
 CPC ....... *H04N 5/23238* (2013.01); *H04N 5/2251* (2013.01); *H04N 5/2252* (2013.01);
 (Continued)

(58) Field of Classification Search
 CPC ............. H04N 5/23238; H04N 5/2258; H04N 5/2251; H04N 5/2252; H04N 5/2253;
 (Continued)

(56) References Cited

U.S. PATENT DOCUMENTS 4,791,477 A  12/1988  Blazek et al.
6,873,367 B1  3/2005  Hirata et al.
(Continued)

FOREIGN PATENT DOCUMENTS

CN  201903752 U  7/2011
CN  102377923 A  3/2012
(Continued)

OTHER PUBLICATIONS

U.S. Appl. No. 62/464,361, filed Feb. 2017, Kolb, Michael.*
(Continued)

*Primary Examiner* — Twyler L Haskins
*Assistant Examiner* — Akshay Trehan
(74) *Attorney, Agent, or Firm* — Harness, Dickey & Pierce, P.L.C.

(57) ABSTRACT

An audio data acquisition device for obtaining audio data, and an audio data acquisition system. The audio data acquisition device for obtaining audio data includes a top surface to be attached to a bottom of an omnidirectional image sensing device. The audio data acquisition system includes the audio data acquisition device for obtaining audio data, and the omnidirectional image sensing device. In the audio data acquisition system, a top surface of the audio data acquisition device is to be attached to a bottom of the omnidirectional image sensing device.

19 Claims, 3 Drawing Sheets

(51) Int. Cl.
*H04R 1/02* (2006.01)
*H04R 1/08* (2006.01)
*H04R 1/40* (2006.01)
*H04R 3/00* (2006.01)
*G03B 17/56* (2021.01)
*G03B 31/00* (2021.01)
*G03B 37/00* (2021.01)

(52) U.S. Cl.
CPC ......... *H04N 5/2253* (2013.01); *H04N 5/2258* (2013.01); *H04R 1/02* (2013.01); *H04R 1/028* (2013.01); *H04R 1/08* (2013.01); *H04R 1/406* (2013.01); *H04R 3/005* (2013.01); *G03B 17/56* (2013.01); *G03B 31/00* (2013.01); *G03B 37/00* (2013.01)

(58) Field of Classification Search
CPC .. H04N 5/22521; H04N 5/22525; H04R 1/02; H04R 1/028; H04R 1/08; H04R 1/406; H04R 3/005; G03B 15/00; G03B 17/56; G03B 31/00; G03B 37/00; F16M 13/02; F16M 13/022; F16M 2200/02; F16M 2200/021; F16M 2200/022; F16M 2200/024; F16B 1/00; F16B 2/00
USPC .......... 396/419–428, 544–545; 348/373–376
See application file for complete search history.

(56) References Cited

U.S. PATENT DOCUMENTS

| | | | | |
|---|---|---|---|---|
| 7,957,765 | B1* | 6/2011 | Causey | H04M 1/72412 455/556.1 |
| 2002/0176004 | A1* | 11/2002 | Shinada | H04R 3/005 348/207.99 |
| 2006/0014563 | A1* | 1/2006 | Cheng | H04M 1/0254 455/557 |
| 2008/0273018 | A1 | 11/2008 | Woolley et al. | |
| 2010/0013986 | A1 | 1/2010 | Yamamoto | |
| 2011/0023238 | A1 | 2/2011 | Orzeck et al. | |
| 2011/0102668 | A1 | 5/2011 | Kaga et al. | |
| 2011/0109790 | A1 | 5/2011 | Shinohara et al. | |
| 2011/0216237 | A1 | 9/2011 | Shinohara et al. | |
| 2011/0298970 | A1 | 12/2011 | Shinohara et al. | |
| 2012/0044382 | A1 | 2/2012 | Chung | |
| 2012/0154665 | A1 | 6/2012 | Kaga et al. | |
| 2012/0154988 | A1 | 6/2012 | Wessells et al. | |
| 2013/0108254 | A1 | 5/2013 | Iinuma | |
| 2013/0141637 | A1 | 6/2013 | Kaga | |
| 2013/0235234 | A1* | 9/2013 | Cucci | H04N 9/8042 348/231.99 |
| 2014/0118606 | A1* | 5/2014 | Sharma | H04M 1/0264 348/345 |
| 2015/0062425 | A1 | 3/2015 | Matsumoto et al. | |
| 2015/0070557 | A1* | 3/2015 | Petty | G03B 17/14 348/333.01 |
| 2016/0142598 | A1 | 5/2016 | Reid | |
| 2017/0126871 | A1 | 5/2017 | Babayev | |
| 2017/0126971 | A1* | 5/2017 | Evans, V | G06T 3/0018 |
| 2017/0311080 | A1 | 10/2017 | Kolb et al. | |
| 2018/0176465 | A1* | 6/2018 | Chen | H04N 5/217 |
| 2019/0064638 | A1 | 2/2019 | O'Neill et al. | |

FOREIGN PATENT DOCUMENTS

| | | |
|---|---|---|
| CN | 203072069 U | 7/2013 |
| CN | 104427451 A | 3/2015 |
| CN | 204496555 U | 7/2015 |
| CN | 205792939 U | 12/2016 |
| CN | 205938386 U | 2/2017 |
| CN | 205961360 U | 2/2017 |
| CN | 205992951 U | 3/2017 |
| CN | 206023974 U | 3/2017 |
| CN | 206775611 U | 12/2017 |
| JP | 2000-350073 A | 12/2000 |
| JP | 2003224895 A | 8/2003 |
| JP | 2006-295718 A | 10/2006 |
| JP | 2013-120970 A | 6/2013 |
| JP | 2013198070 A | 9/2013 |
| JP | 2015-169781 A | 9/2015 |
| JP | 2015-220595 A | 12/2015 |
| JP | 2016114953 A | 6/2016 |

OTHER PUBLICATIONS

U.S. Appl. No. 62/464,261, Kolb.
Office Action for corresponding Chinese Patent Application No. 201810174678.X dated Nov. 25, 2020.
Office Action for corresponding Japanese Patent Application No. 2017-050710 dated Nov. 2, 2020.
Office Action for corresponding Chinese Patent Application No. 202011137290.6 dated Jul. 30, 2021.

* cited by examiner

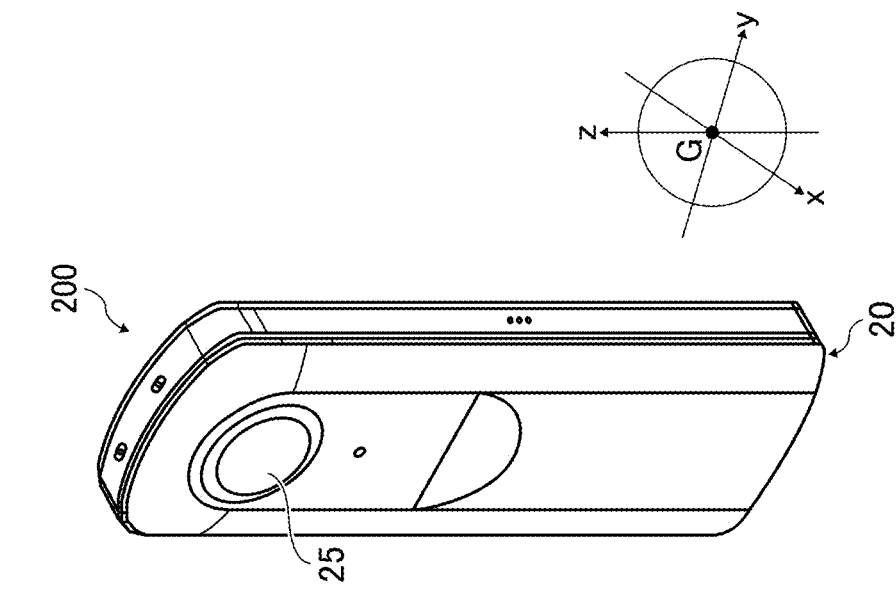
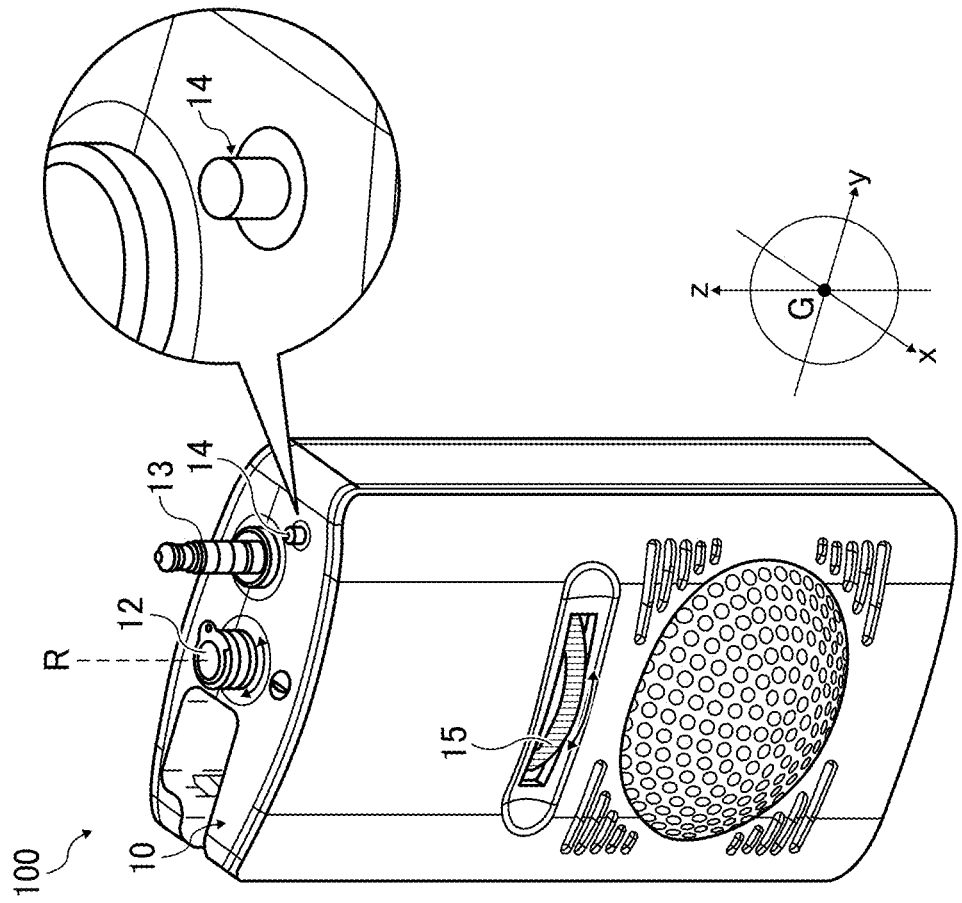

AUDIO DATA ACQUISITION DEVICE INCLUDING A TOP SURFACE TO BE ATTACHED TO A BOTTOM OF AN OMNIDIRECTIONAL IMAGE SENSING DEVICE

CROSS-REFERENCE TO RELATED APPLICATION

This patent application is a divisional of and claims priority under 35 U.S.C. § 120/121 to U.S. application Ser. No. 15/914,097, filed on Mar. 7, 2018, which claims priority pursuant to 35 U.S.C. § 119(a) to Japanese Patent Application No. 2017-050710, filed on Mar. 16, 2017, in the Japan Patent Office, the entire disclosure of each of which is hereby incorporated by reference herein.

BACKGROUND

Technical Field

Embodiments of the present disclosure relate to an audio data acquisition device.

Background Art

Currently, omnidirectional image sensing devices that capture 360-degree omnidirectional images (spherical images) become widespread. Accordingly, various kinds of applications of such omnidirectional cameras have been suggested in many areas of fields.

By way of example, currently, methods of adding a high sense of realism have been suggested. Such methods are achieved by reproducing the omnidirectional picture data (spherical image data) that is captured by an omnidirectional image sensing device in synchronization with the stereophonic sound that is recorded at the same time.

SUMMARY

Embodiments of the present disclosure described herein provide an audio data acquisition device for obtaining audio data, and an audio data acquisition system. The audio data acquisition device for obtaining audio data includes a top surface to be attached to a bottom of an omnidirectional image sensing device. The audio data acquisition system includes the audio data acquisition device for obtaining audio data, and the omnidirectional image sensing device. In the audio data acquisition system, a top surface of the audio data acquisition device is to be attached to a bottom of the omnidirectional image sensing device.

BRIEF DESCRIPTION OF THE DRAWINGS

A more complete appreciation of exemplary embodiments and the many attendant advantages thereof will be readily obtained as the same becomes better understood by reference to the following detailed description when considered in connection with the accompanying drawings.

FIG. 1A is a diagram illustrating an external appearance of an audio data acquisition device according to an embodiment of the present disclosure.

FIG. 1B is a diagram illustrating an external appearance of an omnidirectional image sensing device according to an embodiment of the present disclosure.

Figure 2A:
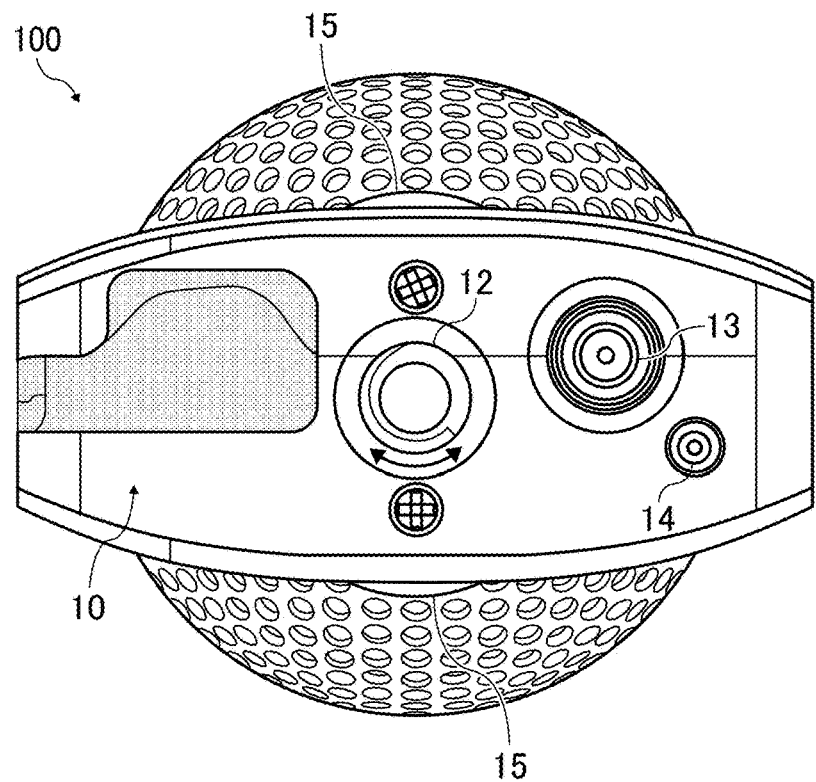
FIG. 2A is a diagram illustrating a top view of an audio data acquisition device according to an embodiment of the present disclosure.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

Some embodiments of the present disclosure are described below, but no limitation is indicated thereby and various applications and modifications may be made without departing from the scope of the disclosure. In the drawings, like reference signs are given to common elements, and the description may be omitted where appropriate. The term "audio data" in the present disclosure is not limited to the data of the voice generated by a person, and the data of music, machinery noise, operational noise, and other kinds of sound that transmits through air vibration may collectively be referred to as the "audio data."

FIG. 1A is a diagram illustrating an external appearance of an audio data acquisition device 100 according to an embodiment of the present disclosure.

The audio data acquisition device 100 according to the present embodiment is a device that obtains audio data, and has approximately a vertically-elongated, slightly-rounded box-like shape.

The audio data acquisition device 100 is provided with four directional microphones in its housing. In the present embodiment, these four directional microphones are disposed at the vertices of a regular tetrahedron where the effective acoustic center G is assumed to be the center of gravity. The distance between any two of the neighboring microphones is made equal to each other, and these microphones are disposed in a shape of regular tetrahedron. Due to this configuration, the processing of the audio data obtained through these four microphones can be simplified. Note also that the arrangement of directional microphones is not limited to a regular tetrahedron, and a polyhedron having a circumscribed sphere is desired. Note also that the number of microphones is not limited to four.

Each of the microphones collects the sound of the W-components that have no directionality, the X-components that have directionality in the X-axis direction (i.e., the forward and backward directions of the device), the Y-components that have directionality in the Y-axis direction (i.e., the width directions of the device), and the Z-components that have directionality in the Z-axis direction (i.e., the height directions of the device). Then, for example, the audio data acquisition device 100 converts the four kinds of components that are collected by the multiple directional microphones into the audio file in the ambisonics format. Those microphones may be directional microphones, or those microphones may be omnidirectional microphones. When directional microphones are used, the sound in the specified directions can be obtained. When nondirectional microphones are used, those microphones can easily be calibrated. Further, the microphones may consist of both directional microphones and omnidirectional microphones in combination.

FIG. 1B is a diagram illustrating an external appearance of an omnidirectional image sensing device 200 according to the present embodiment.

The omnidirectional image sensing device 200 may be referred to simply as an omnidirectional camera 200 in the following description. The omnidirectional camera 200 is a device that captures an omnidirectional image (spherical image), and has approximately a vertically-elongated, slightly-rounded box-like shape in a similar manner to the audio data acquisition device 100. In the omnidirectional camera 200, at least two fish-eye lenses 25 are facing each other. Each of these two fish-eye lenses 25 is disposed so as to protrude from a certain part of the surface of the housing of the omnidirectional camera 200. On the surface of the housing of the omnidirectional camera 200, slots through which the fish-eye lenses 25 are exposed are arranged. These two fish-eye lenses 25 have the same specifications, and are combined in directions reverse to each other such that the optical axes thereof coincide with each other.

In the present embodiment, when the audio data acquisition device 100 is used, a top surface 10 of the audio data acquisition device 100 is fixed onto a bottom 20 of the omnidirectional camera 200. It is not desired that the audio data acquisition device 100 be coupled to a top surface of the omnidirectional camera 200. It is desired that the audio data acquisition device 100 be coupled to the bottom 20 of the omnidirectional camera 200. This is because if the audio data acquisition device 100 is fixed onto the top surface of the omnidirectional camera 200, there is a possibility that an image of the audio data acquisition device 100 is taken into the images that are captured by the omnidirectional camera 200. On the other hand, when the audio data acquisition device 100 is fixed onto the bottom 20 of the omnidirectional camera 200, there is little likelihood that an image of the audio data acquisition device 100 is taken into the images that are captured by the omnidirectional camera 200. In particular, when a part of the housing of the omnidirectional camera 200 lower than the fish-eye lenses 25 is held by hand during the capturing operation, the audio data acquisition device 100 is hidden by hand, and it is highly unlikely that the audio data acquisition device 100 is taken into the images that are captured by the omnidirectional camera 200.

The audio signals that are generated by the audio data acquisition device 100 are transferred to the omnidirectional camera 200.

FIG. 2A is a diagram illustrating top view of the audio data acquisition device 100, according to the present embodiment.

Figure 2B:
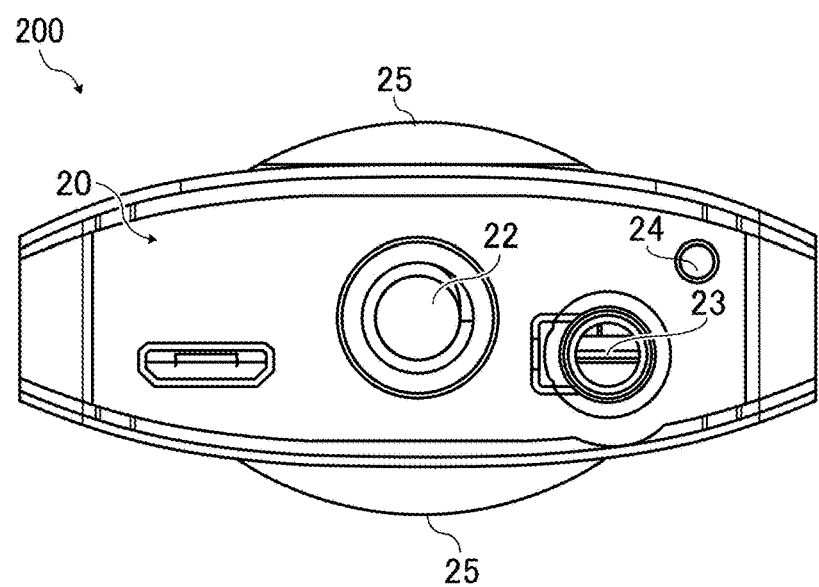
FIG. 2B is a diagram illustrating a bottom view of an omnidirectional image sensing device according to an embodiment of the present disclosure.

FIG. 2B is a diagram illustrating a bottom view of the omnidirectional camera 200, according to the present embodiment.

As illustrated in FIG. 2A, a male screw 12, a pin plug 13, and a positioning pin 14 are formed on the top surface 10 of the audio data acquisition device 100.

The male screw 12 is a screw for fixation. The male screw 12 has a height lower than that of the pin plug 13, and is rotatably supported in the center of the top surface 10. A dial 15 is rolled to rotate the male screw 12. The dial 15 is coupled to the male screw 12 inside the housing of the audio data acquisition device 100. The male screw 12 rotates in the direction indicated by arrow, in synchronization with the rotation of the dial 15.

The positioning pin 14 determines the rotation direction of the omnidirectional camera 200. For example, when the audio data acquisition device 100 is rotated with excessive force, the positioning pin 14 prevents the breakage of the pin plug 13. The positioning pin 14 is a protrusion having a height lower than that of the male screw 12 and the pin plug 13, and it is desired that the positioning pin 14 be made of a material with high stiffness such as metal.

On the other hand, on the bottom 20 of the omnidirectional camera 200, as illustrated in FIG. 2B, a female screw 22 that fits into the male screw 12 is formed at a position corresponding to the male screw 12, and a pin jack 23 is formed at a position corresponding to the pin plug 13. Moreover, on the bottom 20 of the omnidirectional camera 200, a slot for positioning pin 24 is formed at a position corresponding to the positioning pin 14. The slot for positioning pin 24 is a hole (concave portion) having a size into which the positioning pin 14 can be fitted.

In the present embodiment, the female screw 22 that is formed onto the bottom 20 of the omnidirectional camera 200 may serve as hole for attaching a tripod, and a tripod for camera can be attached to the female screw 22. A female screw that is used as a hole for attaching a tripod is also formed on the bottom of the audio data acquisition device 100, and thus a tripod for camera can be attached to the bottom of the audio data acquisition device 100 onto which the omnidirectional camera 200 is fixed. Note also that the diameter of the hole for attaching a tripod on the bottom of the audio data acquisition device 100 is equal to the female screw 22 of the omnidirectional camera 200.

The pin plug 13 and the pin jack 23 have a so-called floating mechanism in which the base is supported by an elastic body. The floating mechanism absorbs the misalignment caused during the fitting operation. Due to this configuration, the pin plug 13 is securely and electrically connected to the pin jack 23.

In the above description, a configuration of the audio data acquisition device 100 and the omnidirectional camera 200 is schematically described. Next, the procedure for coupling the audio data acquisition device 100 to the omnidirectional camera 200 is described.

First of all, the head of the pin plug 13 of the audio data acquisition device 100 is inserted into the pin jack 23 of the omnidirectional camera 200.

Secondly, the head of the male screw 12 of the audio data acquisition device 100 is moved over the slot of the female screw 22 of the omnidirectional camera 200, and the dial 15 is rotated. Accordingly, the male screw 12 rotates around the axis of screw R, and the head of the male screw 12 is screwed into the female screw 22. After that, as the dial 15 is rotated and the male screw 12 rotates, the bottom 20 of the omnidirectional camera 200 and the top surface 10 of the audio data acquisition device 100 gradually get close to each other.

While doing so, the relative positions of the omnidirectional camera 200 and the audio data acquisition device 100 is adjusted such that the slot for positioning pin 24 is positioned right above the positioning pin 14. Then, the dial 15 is kept rotated, and finally, the bottom 20 and the top surface 10 abut on each other in a state where the positioning pin 14 is fitted into the slot for positioning pin 24.

As a result, the omnidirectional camera 200 and the audio data acquisition device 100 are mechanically coupled to each other via the male screw 12 and the female screw 22, and are electrically connected to each other via the pin plug 13 and the pin jack 23. Then, the audio signals that are generated by the audio data acquisition device 100 are transferred to the omnidirectional camera 200 through this electric connection, and the audio signals are processed in the omnidirectional camera 200.

Figure 3:
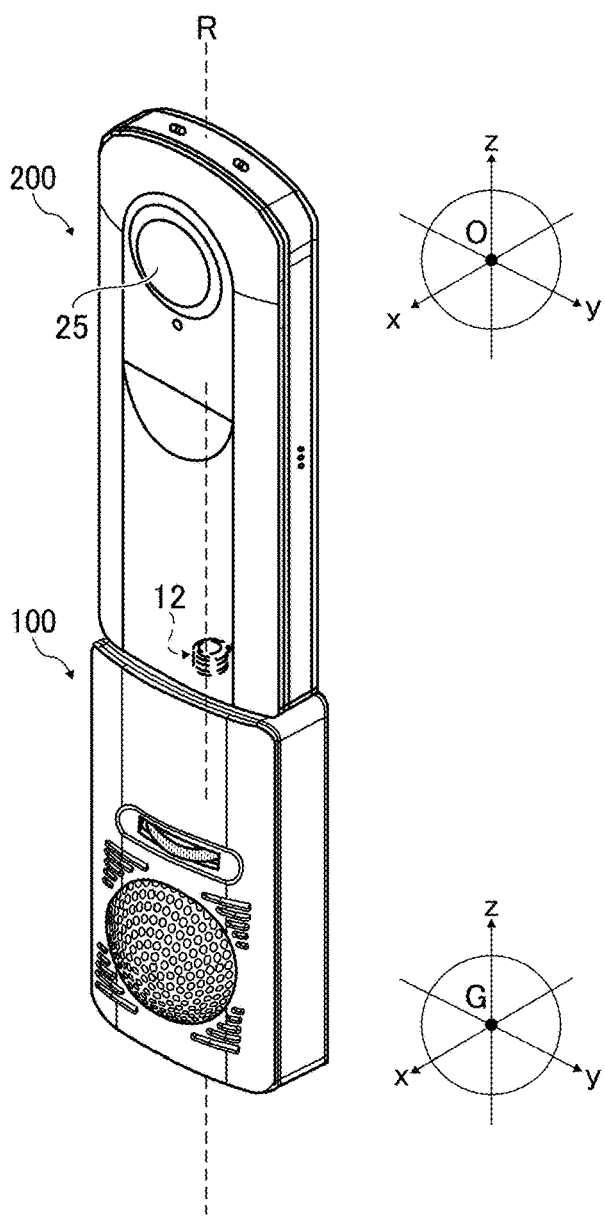
FIG. 3 is a diagram illustrating a state in which an audio data acquisition device and an omnidirectional image sensing device are coupled to each other, according to an embodiment of the present disclosure.

In the present embodiment, the positioning of the direction of rotation of the audio data acquisition device 100 around the axis of screw R of the male screw 12 with reference to the omnidirectional camera 200 is achieved through the positioning pin 14. In the following description, the direction of rotation of the audio data acquisition device 100 around the axis of screw R of the male screw 12 may be referred to simply as the direction of rotation. FIG. 3 is a diagram illustrating a state in which the audio data acquisition device 100 is fixed onto the omnidirectional camera 200, according to the present embodiment.

In the present embodiment, when the audio data acquisition device 100 is fixed onto the omnidirectional camera 200, the axis of screw R of the male screw 12 matches the optical center O of the omnidirectional camera 200 and the acoustic center G of the audio data acquisition device 100. As the positioning of the direction of rotation of the audio data acquisition device 100 with reference to the omnidirectional camera 200 is achieved by the positioning pin 14, the axis of sound collection of the audio data acquisition device 100 in the z-direction matches the zenith direction of the omnidirectional camera 200. Accordingly, the axis of sound collection of the audio data acquisition device 100 in the x-direction becomes parallel to the optical-axis direction of the optical system of the omnidirectional camera 200. Due to this configuration, the omnidirectional picture data (spherical image data) obtained by the omnidirectional camera 200 can accurately be associated with the audio data obtained by the audio data acquisition device 100.

Figure 4:
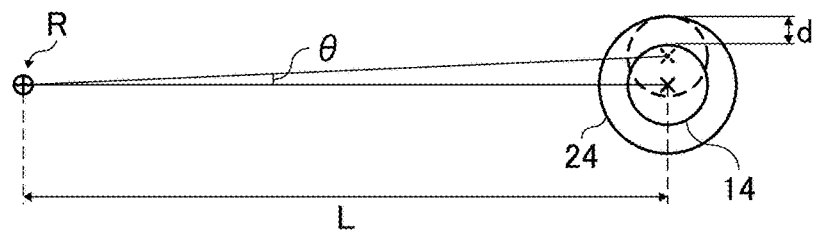
FIG. 4 is a diagram illustrating the position at which a positioning pin of an audio data acquisition device is formed, according to an embodiment of the present disclosure.

Next, the position at which the positioning pin 14 of the audio data acquisition device 100 is formed is described with reference to FIG. 4.

It is assumed that the distance between the positioning pin 14 and the axis of screw R of the male screw 12 (i.e., the center of rotation of the audio data acquisition device 100) is "L", and it is assumed that the size of the gap (loose fit with play) between the positioning pin 14 and the slot for positioning pin 24 is "d." In a state where the positioning pin 14 fits into the slot for positioning pin 24, the rotation of the audio data acquisition device 100 around the rotation axis R with the angle of rotation θ=tan−1(d/L), with reference to the omnidirectional camera 200, is allowed. This means that as the distance L increases, the allowable angle of rotation θ decreases.

In the present embodiment, it is desired that the angle of rotation θ be made smaller as much as possible in order to prevent the breakage of the pin plug 13 and the pin jack 23 and improve the accuracy of the association between the omnidirectional picture data (spherical image data) and the stereophonic audio data. For this reason, in the present embodiment, it is desired on the top surface 10 of the audio data acquisition device 100 that the positioning pin 14 be formed at a position that is far from the axis of screw R of the male screw 12 as much as possible in the allowable range in design. Furthermore, at least, it is desired that the clearance between the position at which the axis of screw R is formed and the position at which the positioning pin 14 is formed be wider than the clearance between the position at which the axis of screw R is formed and the position at which the pin plug 13 is formed.

As described above, the relative positions of the omnidirectional image sensing device 200 and the audio data acquisition device 100 is fixed according to the present embodiment. Accordingly, the accuracy of the synchronization between the omnidirectional picture data (spherical image data) and the stereophonic audio data improves.

Embodiments of the present disclosure has been described above, but the present disclosure is not limited to those embodiments and various applications and modifications may be made without departing from the scope of the invention.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

What is claimed is:

1. An audio data acquisition system configured to obtain audio data, the audio data acquisition system comprising:
   an audio data acquisition device, wherein
   the audio data acquisition device is connectable to a bottom surface of a vertically-elongated predominantly rectangularly shaped omnidirectional image sensing device, having a female screw, by a male screw rotatably connected to a rotatable locking dial.

2. The audio data acquisition system of claim 1, wherein the bottom surface of the vertically-elongated predominantly rectangularly shaped omnidirectional image sensing device includes a hole including threads, the component being connectable to the bottom surface of the vertically-elongated predominantly rectangularly shaped omnidirectional image sensing device via the hole including threads.

3. The audio data acquisition system of claim 2, wherein the vertically-elongated predominantly rectangularly shaped omnidirectional image sensing device includes an optical center on an axis of the hole including threads, of the bottom surface.

4. The audio data acquisition system of claim 3, wherein the vertically-elongated predominantly rectangularly shaped omnidirectional image sensing device includes at least two fish-eye lenses, protruding from at least one surface of the vertically-elongated predominantly rectangularly shaped omnidirectional image sensing device.

5. The audio data acquisition system of claim 2, wherein the component includes an acoustic center on an axis of the hole including threads, of the bottom surface of the vertically-elongated predominantly rectangularly shaped omnidirectional image sensing device.

6. The audio data acquisition system of claim 2, wherein the component includes an acoustic center at an opposing side of the vertically-elongated predominantly rectangularly shaped omnidirectional image sensing device, opposing the hole including threads of the bottom surface.

7. The audio data acquisition system of claim 2, wherein the vertically-elongated predominantly rectangularly shaped omnidirectional image sensing device includes at least two fish-eye lenses, protruding from at least one surface of the vertically-elongated predominantly rectangularly shaped omnidirectional image sensing device.

8. The audio data acquisition system of claim 2, wherein the component is directly connectable to the bottom surface of the vertically-elongated predominantly rectangularly shaped omnidirectional image sensing device including the hole including threads.

9. The audio data acquisition system of claim 1, wherein a bottom surface of the component includes a hole including threads, the audio data acquisition device being mountable to a tripod via the hole including threads.

10. The audio data acquisition system of claim 1, wherein the vertically-elongated predominantly rectangularly shaped omnidirectional image sensing device includes at least two fish-eye lenses.

11. The audio data acquisition system of claim 10, wherein the at least two fish-eye lenses protrude from at least one surface of the vertically-elongated predominantly rectangularly shaped omnidirectional image sensing device.

12. The audio data acquisition system of claim 1, wherein the component is directly connectable to the bottom surface of the vertically-elongated predominantly rectangularly shaped omnidirectional image sensing device.

13. The audio data acquisition system of claim 1, further comprising pin plug on a top surface of the component, wherein the male screw has a height lower than that of the pin plug.

14. A system comprising:
an audio data acquisition device configured to obtain audio data; and
a vertically-elongated predominantly rectangularly shaped omnidirectional image sensing device including a bottom surface including a female screw, a surface of the audio data acquisition device being connectable to the bottom surface of the vertically-elongated predominantly rectangularly shaped omnidirectional image sensing device by a rotatable male screw rotatably connectable to the female screw via a rotatable locking dial, wherein the omnidirectional image sensing device includes at least two fish-eye lenses at one end of the vertically-elongated predominantly rectangularly shaped omnidirectional image sensing device, and
wherein the omnidirectional image sensing device has an area on which the at least two fish-eye lenses are not disposed, the area of the vertically-elongated predominantly rectangularly shaped omnidirectional image sensing device on which the at least two fish-eye lenses are not disposed serves as a holder.

15. The system of claim 14, wherein the audio data acquisition device is directly connectable to the bottom surface of the vertically-elongated predominantly rectangularly shaped omnidirectional image sensing device.

16. The system of claim 14, wherein the audio data acquisition device is directly connectable to the bottom surface of the vertically-elongated predominantly rectangularly shaped omnidirectional image sensing device via a threaded hole in the bottom surface.

17. A vertically-elongated predominantly rectangularly shaped omnidirectional image sensing device including at least two fish-eye lenses, protruding from at least one surface of a housing of the vertically-elongated predominantly rectangularly shaped omnidirectional image sensing device, and including a bottom surface, the bottom surface being connectable to an audio data acquisition device by a male screw rotatably connected to a rotatable locking dial and configured to obtain audio data, wherein
the at least two fish-eye lenses are at one end of the vertically-elongated predominantly rectangularly shaped omnidirectional image sensing device, and wherein the omnidirectional image sensing device has an area on which the at least two fish-eye lenses are not disposed, the area of the vertically-elongated predominantly rectangularly shaped omnidirectional image sensing device on which the at least two fish-eye lenses are not disposed serves as a holder.

18. The vertically-elongated predominantly rectangularly shaped omnidirectional image sensing device of claim 17, wherein the audio data acquisition device is directly connected to the bottom surface of the vertically-elongated predominantly rectangularly shaped omnidirectional image sensing device.

19. The vertically-elongated predominantly rectangularly shaped omnidirectional image sensing device of claim 17, wherein the audio data acquisition device is directly connectable to the bottom surface of the vertically-elongated predominantly rectangularly shaped omnidirectional image sensing device via a threaded hole in the bottom surface.

* * * * *